(12) United States Patent
Lee

(10) Patent No.: US 11,653,428 B2
(45) Date of Patent: May 16, 2023

(54) INTELLIGENT POWER-SAVING LED LIGHT

(71) Applicants: KEUMKYUNG LIGHTING CO.,LTD., Busan (KR); Dong Wook Lee, Busan (KR)

(72) Inventor: Dong Wook Lee, Busan (KR)

(73) Assignees: KEUMKYUNG LIGHTING CO., LTD.; Dong Wook Lee

( * ) Notice: Subject to any disclaimer, the term of this patent is extended or adjusted under 35 U.S.C. 154(b) by 0 days.

(21) Appl. No.: 17/539,379

(22) Filed: Dec. 1, 2021

(65) Prior Publication Data

US 2022/0132634 A1 Apr. 28, 2022

Related U.S. Application Data

(63) Continuation of application No. PCT/KR2021/012280, filed on Sep. 9, 2021.

(30) Foreign Application Priority Data

Oct. 28, 2020 (KR) .................. 10-2020-0141005

(51) Int. Cl.
*H05B 45/18* (2020.01)
*H05B 45/40* (2020.01)

(52) U.S. Cl.
CPC ............. *H05B 45/18* (2020.01); *H05B 45/40* (2020.01)

(58) Field of Classification Search
CPC ......... H05B 45/18; H05B 45/40; H05B 45/48
See application file for complete search history.

(56) References Cited

U.S. PATENT DOCUMENTS

| 8,476,836 | B2* | 7/2013 | van de Ven | .......... | H05B 45/397 |
| | | | | | 315/193 |
| 9,648,682 | B1* | 5/2017 | Zhang | .................. | H05B 45/395 |
| 10,716,187 | B1* | 7/2020 | Yen | ........................ | H05B 45/18 |
| 2011/0273102 | A1* | 11/2011 | van de Ven | ............ | H05B 45/48 |
| | | | | | 315/193 |

FOREIGN PATENT DOCUMENTS

JP 2020013642 A * 1/2020

OTHER PUBLICATIONS

Tomoyuki et al., English translation of JP2020013642A, Jan. 23, 2020, pp. 1-8 (Year: 2020).*

* cited by examiner

*Primary Examiner* — Daniel D Chang
(74) *Attorney, Agent, or Firm* — Park & Associates IP Law Office

(57) ABSTRACT

The present invention relates to an intelligent power-saving LED light, which can maintain constant brightness and save energy by reducing the number of lighted LEDs of LED modules as outside temperature of a lighting device, such as a street light, having a plurality of LED modules gets lower. When potential of a specific point of a temperature change sensing unit gets lower by a thermistor, comparators compare sensed potential with set reference potential and supply actuation signals of switching elements in consecutive order so that specific LEDs are turned off in consecutive order.

2 Claims, 4 Drawing Sheets

|  | Heating Temperautre | Light intensity |
|---|---|---|
| LEVEL 1 | 30 °C less than | 100% |
| LEVEL 2 | 30°C more than 40°C less than | 90% |
| LEVEL 3 | 40°C more than 60°C less than | 80% |
| LEVEL 4 | 60°C more than 70°C less than | 70% |
| LEVEL 5 | 70°C more than 80°C less than | 60% |
| LEVEL 6 | 80°C more than | 50% |

| Ambient temperature | Number of lighted LEDs |
|---|---|
| 25°C | Power : 21.0W<br>Voltage : 30V<br>Current : 0.7A<br><br>Use of 10 LEDs |
| 0°C | Power : 18.9W<br>Voltage : 27V<br>Current : 0.7A<br><br>Use of 9 LEDs |
| -15°C | Power : 16.8.0W<br>Voltage : 24V<br>Current : 0.7A<br><br>Use of 8 LEDs |

FIG. 5

INTELLIGENT POWER-SAVING LED LIGHT

REFERENCE TO RELATED APPLICATIONS

This is a continuation of International Patent Application PCT/KR2021/012280 filed on Sep. 9, 2021, which designates the United States and claims priority of Korean Patent Application No. KR 10-2020-0141005 filed on Oct. 28, 2020, the entire contents of which are incorporated herein by reference.

FIELD OF THE INVENTION

The present invention relates to an intelligent power-saving LED light, which can maintain constant brightness and save energy by reducing the number of lighted LEDs of LED modules as outside temperature of a lighting device, such as a street light, having a plurality of LED modules gets lower.

BACKGROUND OF THE INVENTION

Korean Patent No. 10-1655345 entitled "LED light which adjustable brightness according to device temperature" (hereinafter, called a 'conventional art') discloses an LED lighting device capable of adjusting the quantity of light according to heating temperature of an LED lamp.

FIG. 1 is a block diagram showing the whole configuration of a conventional art, and FIG. 2 is a table of light intensity to heating temperature information data stored in a light intensity storing unit of the conventional art.

The LED light of the conventional art includes: an LED lamp 10 having a plurality of LEDs; a radiating unit 20 mounted to radiate heat generated from the LED lamp 10; a temperature sensor 30 for sensing temperature of the units including the LED lamp 10; a light intensity information storing unit 40 for matching and storing heating temperature and light intensity of the LED lamp 10; a control unit 50 for generating control commands to lower the light intensity of the LED lamp; and a light control unit 60 for lowering the light intensity of the LED lamp 10 according to control commands received from the control unit 50.

Moreover, as illustrated in FIG. 2, the light intensity information storing unit stores information such that the LED lamp is operated at light intensity of 100% when heating temperature is less than 30° C., at light intensity of 90% when heating temperature ranges from 30° C. to 40° C., at light intensity of 80% when heating temperature ranges from 40° C. to 60° C., at light intensity of 70% when heating temperature ranges from 60° C. to 70° C., at light intensity of 60% when heating temperature ranges from 70° C. to 80° C., and at light intensity of 50% when heating temperature is more than 80° C.

Now, an operational process of the conventional art will be described. The control unit 50 searches the light intensity information storing unit 40 when receiving temperature of the LED lamp from the temperature sensor 30, extracts light intensity matched to the heating temperature of the received LED lamp, generates a control command to lower the light intensity of the LED lamp with the extracted light intensity, and transfers the control command to the light control unit 60. Furthermore, the light control unit 60 lowers the light intensity of the LED lamp 10 according to the control command received from the control unit 50.

However, an LED is characterized by generating high light intensity when temperature is low and by generating low light intensity when temperature is high. Considering the above, the conventional art can generate light intensity of 100% in the environment capable of emitting bright light and generate light intensity of 50% in the environment capable of emitting dark light since generating light intensity of 100% at low temperature (30 degrees) and generates light intensity of 50% at high temperature (50 degrees). So, the conventional art causes the result of going counter to the temperature environment.

Additionally, if the conventional art is applied to a street light, the conventional art has a disadvantage in that accurate dimming is not achieved due to noise of a signal when a power supply is installed on a pillar, which is far apart from the LED modules, in order to dim the LED modules.

SUMMARY OF THE INVENTION

Accordingly, the present invention has been made to solve the above-mentioned problems occurring in the prior arts, and it is an object of the present invention to provide an intelligent power-saving LED light, which can maintain constant brightness by reducing the number of lighted LEDs of LED modules in order to lower light intensity of LEDs when temperature is low and by increasing the number of lighted LEDs of the LED modules in order to increase light intensity of the LEDs when temperature is high and can save energy by controlling the number of lighted LEDs.

It is another object of the present invention to provide an intelligent power-saving LED light which can simplify a system by adjusting the number of lighted LEDs without a control of dimming in order to maintain brightness, thereby reducing manufacturing costs and lowering a failure rate.

To accomplish the above object, according to the present invention, there is provided an intelligent power-saving LED light including: a plurality of LEDs connected in series in consecutive order from (+) DC power terminal to (−) DC power terminal; switching elements which make current flowing in specific LEDs among the LEDs be bypassed to the (−) DC power terminal so that the specific LEDs are turned off; a temperature change sensing unit having a thermistor so that potential of a specific part is lowered in proportion to a temperature change when temperature gets lower; and comparators which compare potential sensed from the temperature change sensing unit with reference potential set to each of the comparators and generate output to electrify the switching elements respectively connected to the comparators, wherein the comparators compare the sensed potential with the set reference potential and supply actuation signals of the switching elements in consecutive order when potential of a specific point of the temperature change sensing unit gets lower, so that the specific LEDs are turned off in consecutive order.

Moreover, the specific LEDs are LEDs set in the nearest order to the (−) DC power terminal, and the set LEDs are turned off in the nearest order to the (−) DC power terminal as potential of the specific part gets lower.

Furthermore, the switching elements are JFETs electrified by potential outputted from the comparators, and the comparators output potential to electrify the JFETs when potential of the specific point is lower than reference voltage.

Additionally, there is a difference between reference potentials of the comparators respectively connected to the specific LEDs, and reference potentials of the comparators respectively connected to the LEDs get higher in the nearest order to the (−) DC power terminal.

According to an embodiment of the present invention, the intelligent power-saving LED light can maintain constant brightness and save energy by measuring temperature of LEDs or LED modules, reducing the number of lighted LEDs as temperature is low, and increasing the number of lighted LEDs as temperature is high.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 5 is a plan view illustrating the number of lighted LEDs of LED modules of FIG. 4.

DETAILED DESCRIPTION OF THE INVENTION

Hereinafter, an embodiment of the present invention will be described in detail with reference to the accompanying drawings.

Figures 1, 2:
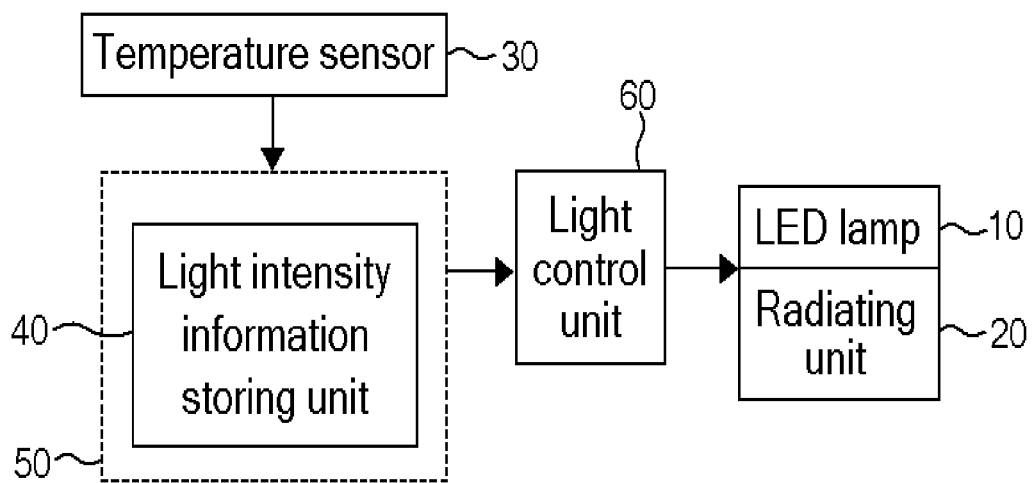
FIG. 1 is a block diagram showing the whole configuration of a conventional art.
FIG. 2 is a table of light intensity to heating temperature information data stored in a light intensity storing unit of the conventional art.
Figure 3:
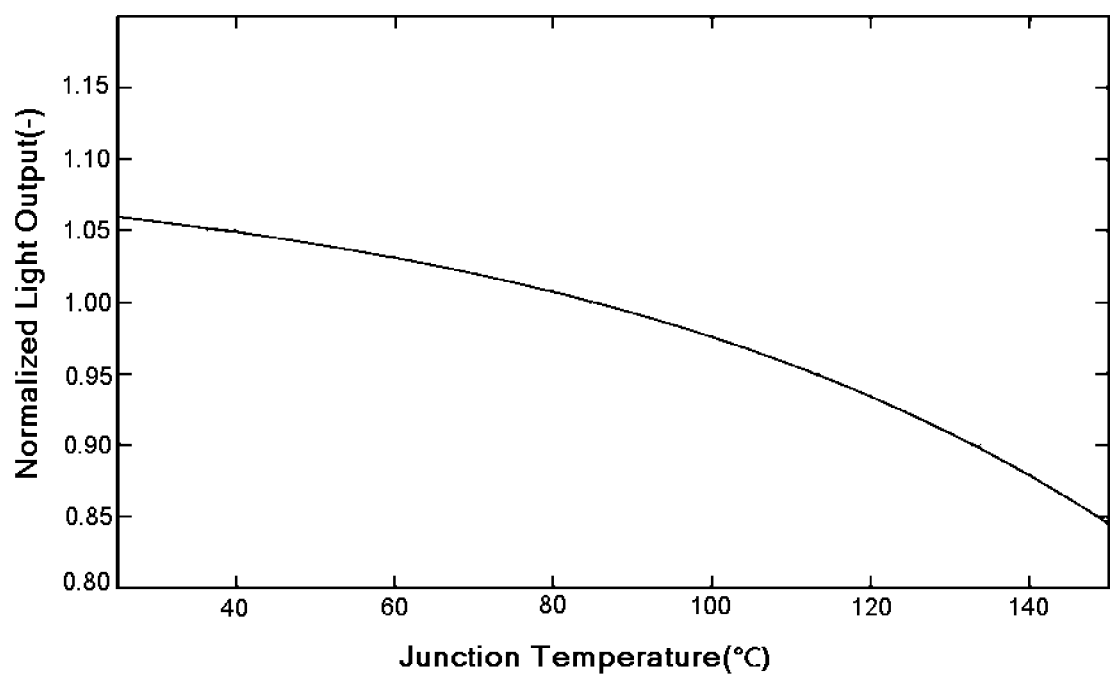
FIG. 3 is a graph of LED temperature and intensity of output light applied to an embodiment of the present invention.

FIG. 3 is a graph of LED temperature and intensity of output light applied to an embodiment of the present invention.

FIG. 3 is a graph illustrating relationship between intensity of output light and LED junction temperature, wherein intensity of output light decreases gradually as LED temperature gets higher.

The fact that intensity of output light gets higher as temperature of LEDs gets lower can be confirmed from various LED data books, such as LG3535 HP LED's data book page 14 of LG Innotek Co., Ltd.

Figure 4:
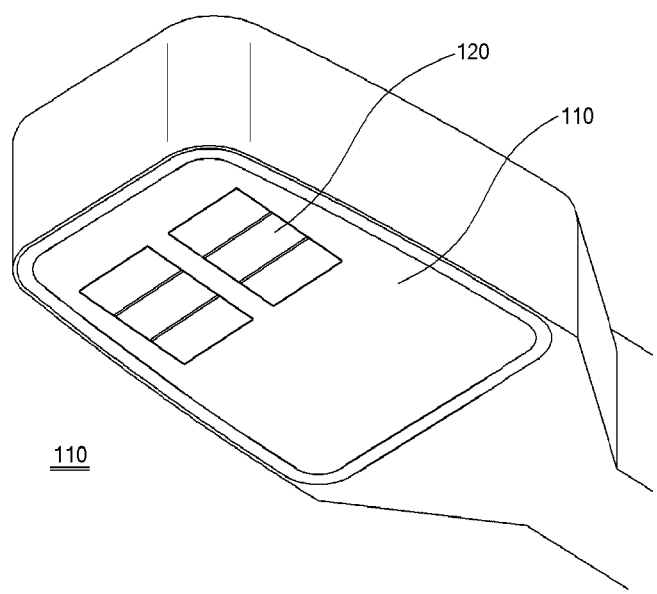
FIG. 4 is a perspective view of a head of a street light according to an embodiment of the present invention.

FIG. 4 is a perspective view of a head of a street light according to an embodiment of the present invention, and FIG. 5 is a plan view illustrating the number of lighted LEDs of LED modules of FIG. 4.

Figure 6:
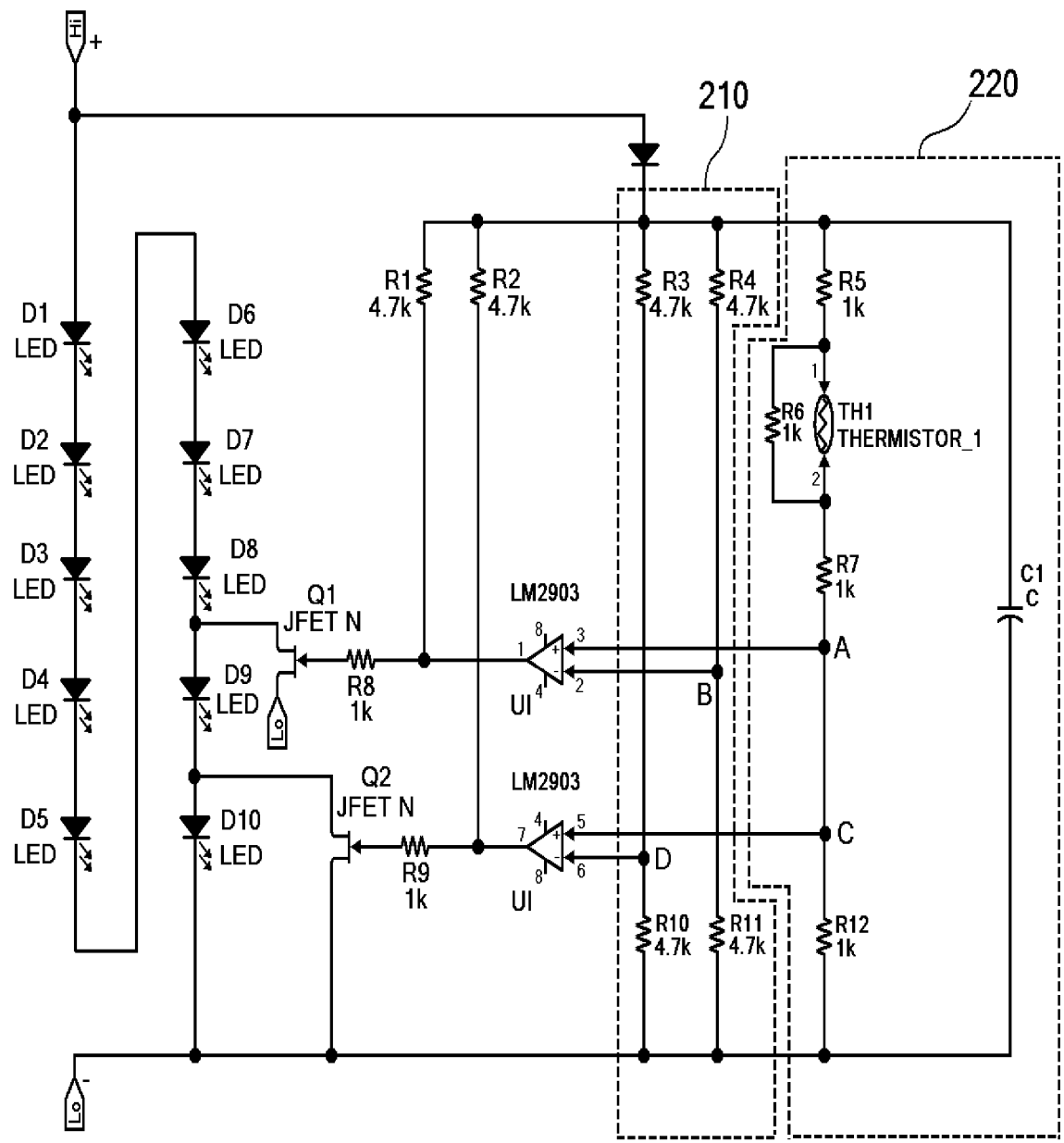
FIG. 6 is a circuit diagram according to an embodiment of the present invention.

A street light head 100 has six LED modules 120 mounted on a frame thereof, and each of the LED modules 120 has 10 LEDs as illustrated in FIG. 6.

Moreover, the 10 LEDs mounted on the LED module 120 are connected in series. All of the 10 LEDs are turned on at 25° C. so that power of 21 W with applied voltage of 30V and current of 0.7 A is consumed, 9 LEDs are turned on at 0° C. so that power of 18.9 W with applied voltage of 27V and current of 0.7 A is consumed, and 8 LEDs are turned on at −15° C. so that power of 16.8 W with applied voltage of 24V and current of 0.7 A is consumed.

FIG. 6 is a circuit diagram according to an embodiment of the present invention.

In the circuit diagram of FIG. 6, TH1 is a positive temperature coefficient thermistor (PTC thermistor) that resistance increases as temperature increases. A resistance dynamic range $\Delta R(\Delta R=k\Delta T)$ is proportional to a temperature change range $\Delta T$, wherein K is temperature coefficient of resistance.

The thermistor (TH1) (not shown) is mounted inside the street light head 100, and all of 10 LEDs are turned on at room temperature (25° C.), but temperature reaches 0° C. while getting lower. Then, the LED 10 is turned off at $R_{0°\,C.}$ resistance value, and temperature gets lower to −15° C. Then, the LED 10 and LED 9 are turned off at R−15° C. resistance value.

The 10 LEDs ranging from D1 to D10 are connected in series between + and −DC input terminals. When a drain and a source of JFET, which is a switching element Q2, are connected to both ends of the final LED 10 and low voltage is applied to a gate, current is connected, and the LED 10 is turned off.

When the drain of the JFET, which is the switching element Q2, is connected to a connection point between the LED 10 and the LED 9 and the source is connected to the −DC input terminal so that the JFET which is the switching element Q2 is electrified, current outputted from the LED 9 is connected to the JFET which is the switching element Q2 and is bypassed to the DC input terminal so that the LED 10 is turned off.

Likewise, the drain and the source of the JFET which is a switching element Q1 are also connected to the LED 9 which is mounted in front of the LED 10. When low voltage is applied to the gate, current inputted to the −DC input terminal bypasses so that the LED 9 and the LED 10 are turned off.

Additionally, a reference voltage setting unit 210 and a temperature change sensing unit 220 are mounted between the + and −DC input terminals, and voltage from the +DC input terminal is supplied to the reference voltage setting unit 210 and the temperature change sensing unit 22 through a diode D11.

The reference voltage setting unit 210 is mounted between a +terminal, which is an output terminal of the diode D11, and the −DC input terminal, and includes a first reference voltage part having resistances R4 and R11 and a second reference voltage part having resistances R3 and R10.

In this instance, voltage of a contact point (D) between the resistance R3 and the resistance R10 of the second reference voltage part is higher than voltage of a contact point (B) of the resistance R4 and the resistance R11 of the first reference voltage part.

In addition, the temperature change sensing unit 220 is mounted between a +terminal, which is an output terminal of the diode D11 and the −DC input terminal and the thermistor TH1 is mounted, so that a variable voltage part changing resistance in proportion to temperature and resistance R12 are connected in series. The variable voltage part includes a resistance R5, a resistance R6, a parallel part of the thermistor (TH1), and a resistance R7.

The point B which is the connection point between the resistances R4 and R11 of the first reference voltage part of the reference voltage setting unit 210 is connected to a non-inverting terminal of a comparator U1, and a point A which is a connection point between the variable voltage part of the temperature change sensing unit 220 and the resistance R7 is inputted to the non-inverting terminal of the comparator U1.

The point D which is the connection point between the resistances R3 and R10 of the second reference voltage part of the reference voltage setting unit 210 is connected to a non-inverting terminal of a comparator U2, and a point C which is a connection point between the variable voltage part of the temperature change sensing unit 220 and the resistance R7 is inputted to the non-inverting terminal of the comparator U2.

Output of the comparator U1 is connected to the gate of the switching element Q1 through a resistance R8, and output of the comparator U2 is connected to the gate of the switching element Q2 through a resistance 9.

When temperature gets lower from room temperature (25° C.) and reaches 0° C., resistance of the thermistor TH1 becomes $R_{0°C}$, and when potential of the point C gets lower than potential of the point D, output of the comparator U2 becomes low. Therefore, the switching element Q2 is electrified, and finally, the LED 10 is turned off.

When temperature gets lower from room temperature (0° C. and reaches −15° C. and resistance of the thermistor TH1 becomes R−15° C. so that potential of the point A is lower than that of the point B, output of the comparator U1 becomes low and the switching element Q1 is electrified, so that the LED 9 is turned off.

As described above, the switching elements operated by the comparators are connected to the LEDs, and the switching elements are electrified as temperature gets lower, so that the LEDs can be turned off in consecutive order as temperature gets lower.

Moreover, because the number of lighted LEDs is decreased as temperature gets lower but brightness gets higher, the present invention can maintain overall brightness uniform.

What is claimed is:

1. An intelligent power-saving LED light comprising:
   a plurality of LEDs connected in series in consecutive order from a positive DC power terminal to a negative DC power terminal;
   switching elements which make current flowing in specific LEDs among the plurality of LEDs is bypassed to the negative DC power terminal so that the specific LEDs are turned off;
   a temperature change sensing unit having a thermistor so that potential of a specific part is lowered in proportion to a temperature change when temperature is lowered; and
   comparators which compare potential sensed from the temperature change sensing unit with reference potential connected to each of the comparators and generate output voltage to the switching elements respectively connected to the comparators,
   wherein the comparators compare the sensed potential with the reference potential and supply the output signal to the switching elements in consecutive order when the potential of the specific part of the temperature change sensing unit is lower than the reference potential, so that the specific LEDs are turned off in consecutive order,
   wherein the switching elements are JFETs, and the comparators output the output voltages to turn on the JFETs when the potential of the specific part of the temperature change sensing unit is lower than reference potential,
   wherein the specific LEDs are connected closest to the negative DC power terminal, and reference potentials of the comparators respectively connected to the specific LEDs connected closest to the negative DC power terminal is higher than the potential of the specific part of the temperature change sensing unit.

2. The intelligent power-saving LED light according to claim 1, wherein, the specific LEDs connected closest to the negative DC power terminal are turned off when the potential of the specific part of the temperature change sensing unit is lower than the reference potential.

* * * * *